United States Patent
Iordanidis et al.

(10) Patent No.: US 9,555,782 B2
(45) Date of Patent: *Jan. 31, 2017

(54) AIRCRAFT ELECTRIC BRAKING SYSTEM

(71) Applicant: AIRBUS OPERATIONS LIMITED, Bristol (GB)

(72) Inventors: George Iordanidis, Bristol (GB); John Rees, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,591

(22) Filed: Nov. 26, 2014

(65) Prior Publication Data

US 2015/0151728 A1    Jun. 4, 2015

(30) Foreign Application Priority Data

Nov. 27, 2013 (GB) .................................. 1320939.0

(51) Int. Cl.
  *B60T 8/17*    (2006.01)
  *B60T 8/176*    (2006.01)
  (Continued)

(52) U.S. Cl.
  CPC .............. *B60T 8/1703* (2013.01); *B60T 8/17* (2013.01); *B60T 8/176* (2013.01); *B60T 8/885* (2013.01);
  (Continued)

(58) Field of Classification Search
  CPC ........ B60T 8/176; B60T 8/1703; B60T 8/885; B60T 2270/402; B60T 8/17; B64C 25/44; B64C 25/46
  (Continued)

(56) References Cited

U.S. PATENT DOCUMENTS 6,003,640 A * 12/1999 Ralea ................. B60T 8/1703
  188/1.11 L
6,115,656 A * 9/2000 Sudolsky ............. B64F 5/0045
  701/3

(Continued)

FOREIGN PATENT DOCUMENTS

EP   1 484 244 A1    12/2004
EP   2 460 323       12/2009
  (Continued)

OTHER PUBLICATIONS

US Search Report for GB Application No. 1320939.0, dated Jun. 12, 2014, Jason Clee, 1 page.
  (Continued)

*Primary Examiner* — Atul Trivedi
(74) *Attorney, Agent, or Firm* — Nixon & Vanderhye P.C.

(57) ABSTRACT

An electrically actuated braking system for an aircraft. The system includes: an electro-mechanical brake actuator (EMAbrake) proximate a wheel of the aircraft, the EMAbrake including a motor; an electro-mechanical actuator controller (EMAC) including a motor controller for generating a drive signal for the EMAbrake; a braking control unit (BCU) for generating a braking force command signal for the EMAC during a normal mode of operation; and an emergency braking control unit (eBCU) for generating a braking force command signal for the EMAC during an emergency operating mode. The eBCU is disposed together with the EMAC in a common line replaceable unit (LRU).

20 Claims, 9 Drawing Sheets

(51) Int. Cl.
  *B64C 25/44* (2006.01)
  *B64C 25/46* (2006.01)
  *B60T 8/88* (2006.01)
(52) U.S. Cl.
  CPC ............. *B64C 25/44* (2013.01); *B64C 25/46* (2013.01); *B60T 2270/402* (2013.01)
(58) Field of Classification Search
  USPC ............................................................ 701/3
  See application file for complete search history.

(56) References Cited

U.S. PATENT DOCUMENTS

| | | | | |
|---|---|---|---|---|
| 6,142,580 | A * | 11/2000 | Sinn | B60T 13/665 174/113 R |
| 6,203,116 | B1 * | 3/2001 | Dieckmann | B60T 8/885 303/122 |
| 6,296,325 | B1 | 10/2001 | Corio et al. | |
| 6,402,259 | B2 | 6/2002 | Corio et al. | |
| 6,416,140 | B1 * | 7/2002 | Yamamoto | B60T 8/00 303/122 |
| 6,471,015 | B1 * | 10/2002 | Ralea | B60T 8/1703 188/1.11 L |
| 2001/0045771 | A1 * | 11/2001 | Corio | B60T 8/1703 303/20 |
| 2005/0110339 | A1 * | 5/2005 | Kolberg | B60T 13/74 303/20 |
| 2005/0148327 | A1 * | 7/2005 | Perez | H04L 41/069 455/431 |
| 2006/0061210 | A1 * | 3/2006 | Ralea | B60T 8/1703 303/20 |
| 2006/0108867 | A1 * | 5/2006 | Ralea | B60T 1/10 303/152 |
| 2007/0132311 | A1 * | 6/2007 | Giazotto | B60T 8/1703 303/126 |
| 2007/0222285 | A1 * | 9/2007 | Ribbens | B60T 8/1703 303/139 |
| 2007/0235267 | A1 * | 10/2007 | Liebert | B60T 7/108 188/1.11 L |
| 2008/0030069 | A1 | 2/2008 | Griffith et al. | |
| 2008/0133072 | A1 * | 6/2008 | Yamamoto | B60T 17/221 701/9 |
| 2008/0133073 | A1 | 6/2008 | Griffith et al. | |
| 2008/0258548 | A1 | 10/2008 | May et al. | |
| 2008/0302813 | A1 | 12/2008 | Yanagisawa et al. | |
| 2009/0278401 | A1 | 11/2009 | Summers et al. | |
| 2010/0078519 | A1 * | 4/2010 | Cahill | B60T 8/1703 244/111 |
| 2010/0106347 | A1 * | 4/2010 | Cahill | B64C 25/44 701/3 |
| 2010/0106356 | A1 * | 4/2010 | Trepagnier | G01S 17/023 701/25 |
| 2010/0274458 | A1 * | 10/2010 | Cahill | B60T 8/1703 701/76 |
| 2010/0276988 | A1 * | 11/2010 | Cahill | B60T 8/1703 303/20 |
| 2010/0280725 | A1 * | 11/2010 | Cahill | B60T 8/1703 701/70 |
| 2011/0018337 | A1 * | 1/2011 | King | B60T 8/1703 303/13 |
| 2011/0040466 | A1 * | 2/2011 | Hill | B60T 8/1703 701/74 |
| 2011/0155521 | A1 | 6/2011 | Thibault et al. | |
| 2011/0226569 | A1 * | 9/2011 | Devlieg | B60T 8/1703 188/158 |
| 2012/0145490 | A1 * | 6/2012 | Clary | B60T 8/1703 188/1.11 E |
| 2012/0175198 | A1 | 7/2012 | Thibault et al. | |
| 2012/0217339 | A1 * | 8/2012 | Gilleran | B64C 25/405 244/50 |
| 2012/0273309 | A1 * | 11/2012 | Thibault | B60T 8/00 188/158 |
| 2012/0325573 | A1 * | 12/2012 | Miller | B60L 7/24 180/282 |
| 2013/0175403 | A1 * | 7/2013 | Spray | B60T 8/1703 244/235 |
| 2013/0253736 | A1 * | 9/2013 | Frank | B64C 25/426 701/3 |
| 2014/0018978 | A1 * | 1/2014 | Cahill | B60T 8/1703 701/3 |
| 2015/0129368 | A1 * | 5/2015 | Cahill | B60T 8/1703 188/71.5 |
| 2015/0291279 | A1 * | 10/2015 | Iordanidis | B60T 8/1703 188/156 |
| 2015/0291280 | A1 * | 10/2015 | Iordanidis | B60T 8/1703 244/111 |

FOREIGN PATENT DOCUMENTS

| | | |
|---|---|---|
| EP | 2 284 054 | 2/2011 |
| EP | 2 463 166 A1 | 6/2012 |
| WO | WO 2008/052051 | 5/2008 |
| WO | WO 2008/144378 | 11/2008 |
| WO | WO 2013/119242 | 8/2013 |

OTHER PUBLICATIONS

Extended Search Report in European Patent Application No. 14195202.8 mailed Apr. 7, 2015, seven pages.

* cited by examiner

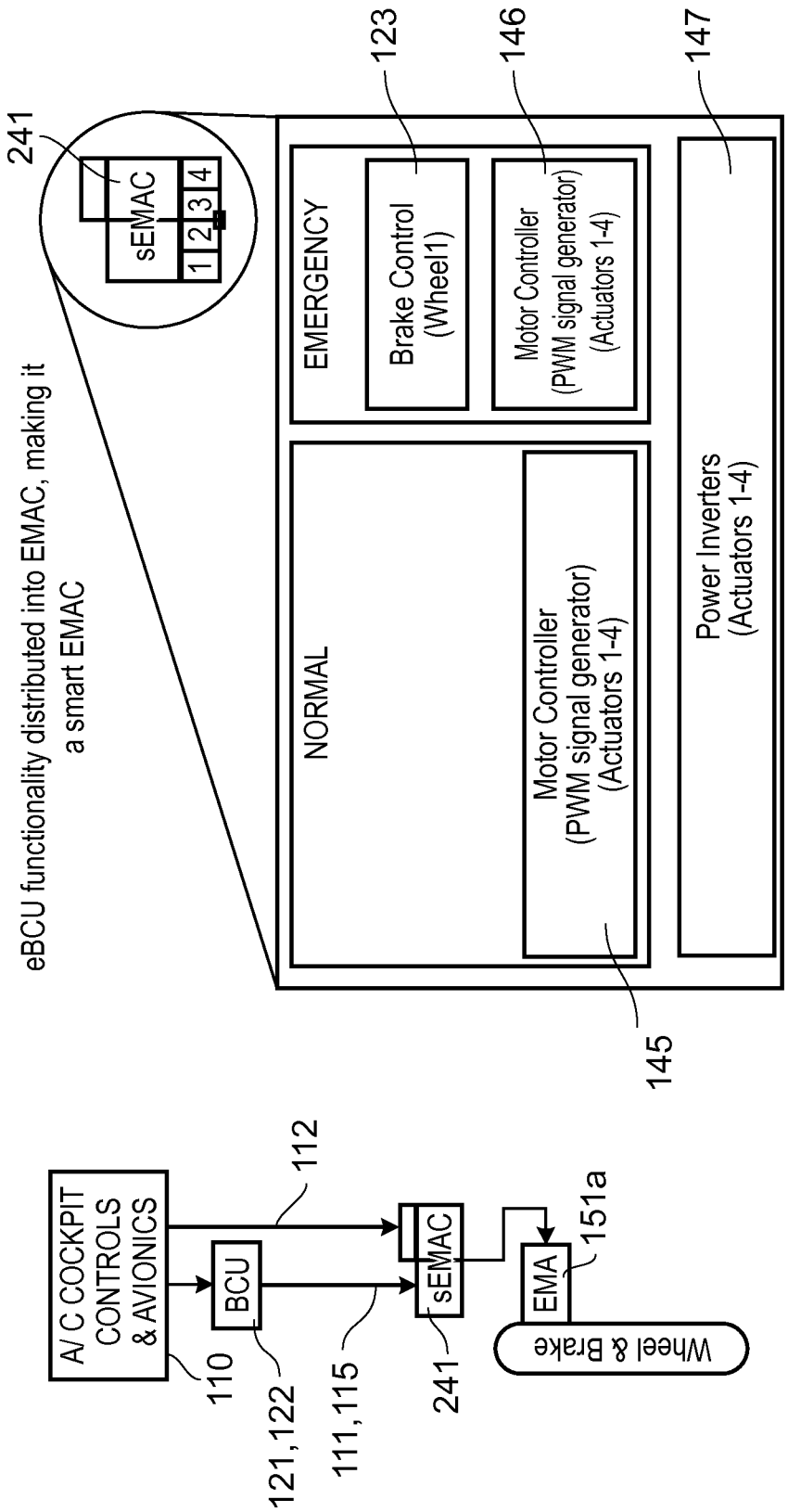

Table 1

| Functional Block | Description |
|---|---|
| A/C COCKPIT CONTROLS & AVIONICS | A/C Cockpit Controls and Aircraft Avionics |
| BCU | Brake Control Unit |
| BCU (wRDC) | Brake Control Unit (in an axle RDC embodiment) |
| Router | Data Bus Router |
| eBCU | Emergency Brake Control Unit |
| EBPSU | Electric Brake Power Supply Unit |
| EMAC | Electro-Mechanical Actuator Controller |
| sEMAC or sEMAC or sEMAC | Smart Electro-Mechanical Actuator Controller |
| EMA | Electro-Mechanical Actuator |
| EMA EMAC | Smart Electro-Mechanical Actuator |
| EMA EMAC or EMA EMAC or EMA EMAC | Fully Smart Electro-Mechanical Actuator |
| Wheel & Brake | Wheel & Brake |

FIG. 10

AIRCRAFT ELECTRIC BRAKING SYSTEM

CROSS-REFERENCE TO RELATED APPLICATION

This application claims priority to GB Application No. 1320939.0, filed 27 Nov. 2013, the entire content of which is hereby incorporated by reference.

FIELD OF THE INVENTION

The present invention relates to an electrically actuated braking system for an aircraft.

BACKGROUND OF THE INVENTION

Electric systems are gradually replacing hydraulic systems on many commercial, and military, aircraft. Current "brake by wire" aircraft systems may have a generally centralised architecture in which pilot inputs are interpreted and command and monitoring signals are communicated via a databus and as analogue/discrete signals to a brake control unit (BCU). An exemplary centralised architecture is described in US 2008/0030069 A1.

The BCU interprets the commands from the aircraft cockpit controls and avionics and calculates braking force commands for each actuated landing gear wheel of the aircraft. This may include fast loop anti-skid control.

Each braking wheel will have at least one electro-mechanical actuator (EMA) for providing a clamping force to the brake for that wheel, which converts the clamping force to a braking torque. Electro-mechanical actuator controllers (EMACs) may be disposed within the landing gear bay and electrically connected to a plurality of brake EMAs coupled to wheel and brake groups. Typically, each wheel and brake group includes a plurality of brake EMAs coupled via a brake assembly to a wheel. The EMACs interpret the brake force commands from the BCU and receive electrical power to provide power to drive the EMAs.

Typically at least two BCUs are provided. The plurality of BCUs may be arranged for redundancy and/or fault tolerance. In a redundant configuration, the BCUs may be assigned to particular sides, e.g. aircraft avionics network side or electrical power network side. The EMACs may therefore receive brake force commands from any BCU. To maximise commonality of parts the EMACs may all be identical so as to minimise the cost and complexity of design, manufacture, installation, repair, replacement, etc. of parts. There is a therefore a potential for simultaneous failure of several EMACs leading to partial or full loss of braking control, which is undesirable. The EMAC may be considered a "complex" part, i.e. it is not fully testable, as defined in ARP4754.

SUMMARY OF THE INVENTION

The invention provides an electrically actuated braking system for an aircraft, comprising: an electro-mechanical brake actuator (EMAbrake) proximate a wheel of the aircraft, the EMAbrake including a motor; an electro-mechanical actuator controller (EMAC) including a motor controller for generating a drive signal for the EMAbrake; a braking control unit (BCU) for generating a braking force command signal for the EMAC during a normal mode of operation; and an emergency braking control unit (eBCU) for generating a braking force command signal for the EMAC during an emergency operating mode, wherein the eBCU is disposed together with the EMAC in a common line replaceable unit (LRU).

The BCU may be disposed together with the EMAC in a common line replaceable unit (LRU). Alternatively, the BCU may be disposed remote from the EMAC.

The EMAC may be disposed remote from the EMAbrake.

The BCU and/or the eBCU may be operable to perform anti-skid brake control.

The EMAC may include a first motor controller for generating a first drive signal for the EMAbrake, and a second motor controller for generating a second drive signal for the EMAbrake.

The first motor controller and the second motor controller may each comprise hardware for generating a pulse-width modulation signal.

The first motor controller and the second motor controller may include similar hardware for generating a pulse-width modulation signal. Alternatively, the first motor controller and the second motor controller may include dissimilar hardware for generating a pulse-width modulation signal so as to provide protection against common mode failure of the first and second motor controllers.

The first motor controller and the second motor controller may each comprise similar or dissimilar hardware selected from the group comprising: a microprocessor, a microcontroller, a digital signal processor, an application specific integrated circuit, a programmable logic device, a complex programmable logic device, a field programmable gate array, and a transistor based discrete electronics switching circuit.

The BCU may be operable on a normal brake channel, the eBCU may be operable on an emergency brake channel, the first motor controller may be operable on a normal motor control channel, and the second motor controller may be operable on an emergency motor control channel. The BCU may be configured to communicate with the first motor controller and not the second motor controller, and the eBCU may be configured to communicate with the second motor controller and not the first motor controller.

For example, the normal brake channel and the normal motor control channel may be coupled so as to form a normal channel, and the emergency brake channel and the emergency motor control channel may be coupled so as to form an emergency channel, and the system may further comprise a switch for switching between the normal channel and the and emergency channel.

Alternatively, the BCU may be configured to communicate with either the first motor controller or the second motor controller, and the eBCU may be configured to communicate with either the first motor controller or the second motor controller.

A first switch may be provided for switching between the normal and emergency brake channels, and a second switch may be provided for switching between the normal and emergency motor control channels. The first switch and the second switch may be independently switchable.

A source switch may be operatively coupled between the normal and emergency motor control channels and the EMAbrake for switching the EMAbrake control depending on the selected motor control channel. Alternatively, an OR gate may be operatively coupled between the normal and emergency motor control channels and the EMAbrake for controlling the EMAbrake depending on the operative motor control channel.

The BCU may include redundant brake control channels each for communicating with aircraft cockpit controls and avionics via a respective databus.

Also, an aircraft including the electrically actuated braking system above.

BRIEF DESCRIPTION OF THE DRAWINGS

Embodiments of the invention will now be described with reference to the accompanying drawings, in which:

FIG. 8 illustrates a schematic of the control of a single EMA of a second embodiment in which only the eBCU functionality is incorporated in the smart EMAC;

FIG. 9 illustrates a schematic of the "smart" EMAC used in the second embodiment having dissimilar normal and emergency motor controllers and eBCU functionality; and FIG. 10 shows Table 1 which lists a brief description of the function blocks illustrated in the Figures.

DETAILED DESCRIPTION OF EMBODIMENT(S)

Figure 1:
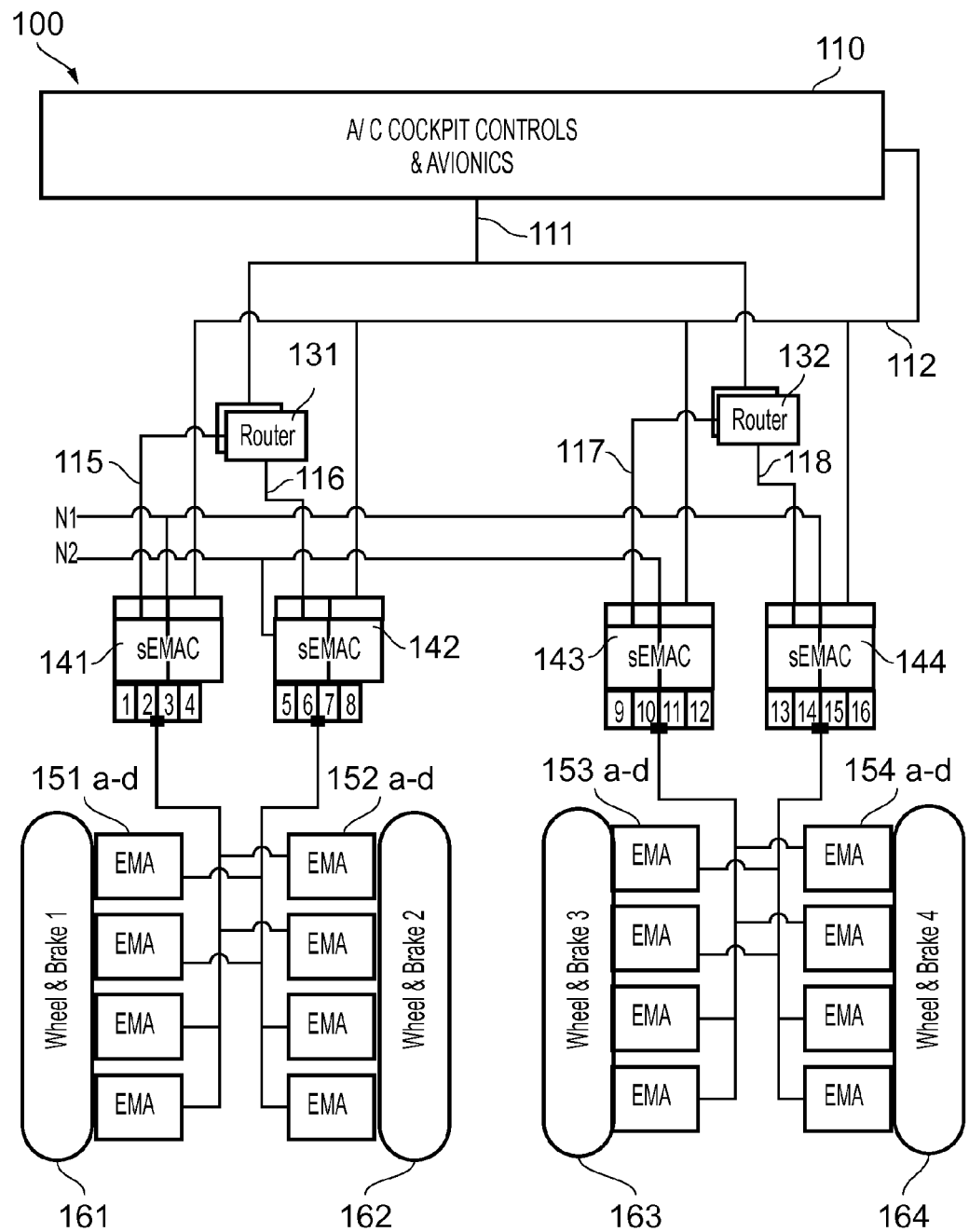
FIG. 1 illustrates a first embodiment of an electrically actuated aircraft braking system featuring distributed avionics, with "smart" EMACs.

The electrically actuated aircraft braking system 100 of the first embodiment shown in FIG. 1 is configured for an aircraft having two braked main landing gears, one on either side of the aircraft centre line. However, it will be appreciated that the invention described herein relates to any aircraft configuration having braking wheels, including aircraft with more than two main landing gears and/or braked nose landing gear. The braking system 100 features (partially) distributed avionics.

Figure 3:
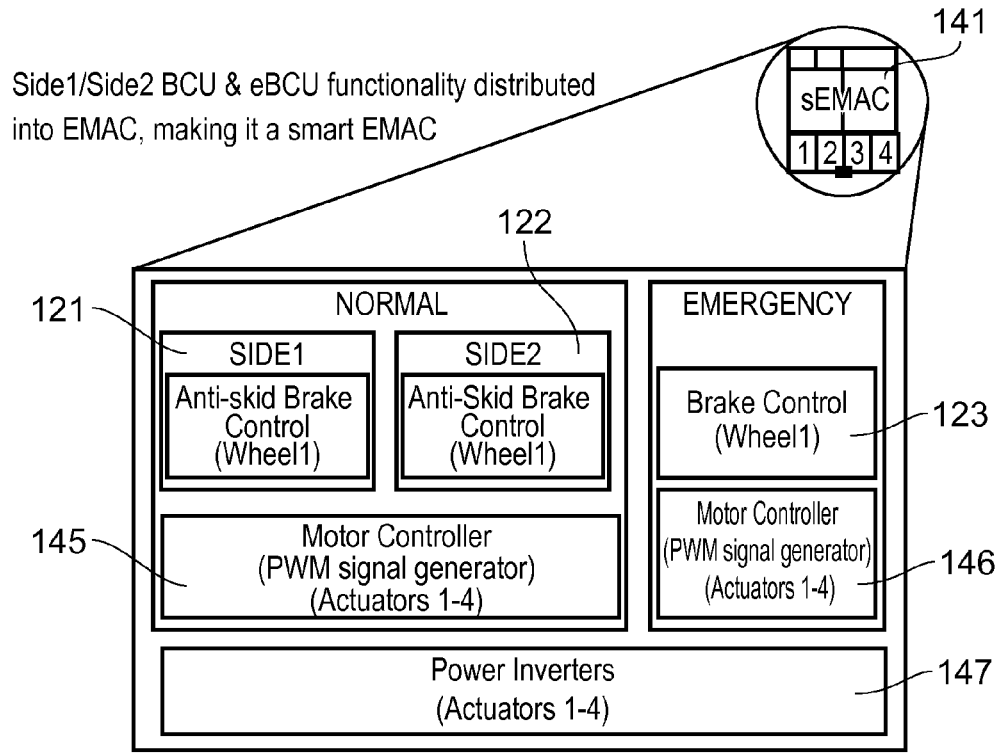
FIG. 3 illustrates a schematic of the "smart" EMAC used in the first embodiment having dissimilar normal and emergency motor controllers and integrated BCU and eBCU functionality.

As best shown in FIG. 3 the braking system 100 comprises both a normal and an emergency system. The normal system includes dual redundant brake control units (BCUs) 121, 122 assigned to particular sides, e.g. aircraft avionics network or electrical power network sides (side1, side2, etc.). The emergency system includes an emergency BCU (eBCU) 123. The eBCU 123 provides protection against loss of function of both BCUs 121, 122, e.g. from failure of the BCUs, failure of the A/C avionics, failure of the communications databus, or failure of a power supply (depending on the power supply configuration)—all of which could lead to a loss of function for the BCU. The system 100 includes "smart" electromechanical actuator controllers (smart EMACs) 141, 142, 143, 144 in which the side1 BCU, side2 BCU and eBCU functionality is packaged within the EMAC in a single line replaceable unit (LRU).

The BCUs 121, 122 receive input from aircraft cockpit controls and avionics 110 via one or more databuses 111 and the eBCUs 123 receive input from aircraft cockpit controls and avionics 110 via one or more databuses 112 or analogue and/or discrete signals, e.g. from a brake pedal transmitter unit (BPTU) indicating a brake pedal angle. Note that not all signal routes are shown in the figures so as not to obscure the clarity of the description of the invention.

The BCUs 121, 122 interpret signals from the aircraft cockpit controls and avionics 110 and issue braking force commands on a per wheel basis to motor controllers within the smart EMACs 141, 142, 143, 144. In the aircraft configuration shown in FIG. 1 there are four wheel and brake groups 161, 162, 163, 164, each associated with four electromechanical actuators (EMAs) 151a-d, 152a-d, 153a-d, 154a-d. Of course, there may be a greater or fewer number of wheel and brake groups or EMAs.

The smart EMACs 141-144 are coupled via routers 131, 132 to the aircraft cockpit controls and avionics 110. The routers 131, 132 route digital databus signals from the aircraft cockpit controls and avionics 110 to the smart EMACs (and vice versa) via local databuses 115-118. The motor controllers 145, 146 interpret brake force commands from the BCUs 121, 122 within the smart EMACs 141-144, which receive electrical power from the aircraft power networks N1, N2 (note only the high voltage parts of the aircraft power networks N1, N2 are shown in FIG. 1). The smart EMACs each include electric braking power supply unit (EBPSU) functionality coupled to the aircraft power network. The EBPSU includes a safety power interlock, and may further include power source switching and/or power conversion, if required. The smart EMACs 141-144 provide power and control signals to drive the EMAs 151-154.

Each smart EMAC 141-144 provides brake control signals for the brake groups 161, 162, 163, 164. The BCUs 121, 122 perform a fast loop anti-skid control for each of the braking wheels of the wheel and brake groups 161-164.

Each smart EMAC 141-144 is operable to drive four of the EMAs. On the left hand side of the aircraft, including wheel and brake groups 1 and 2, their associated smart EMACs drive two EMAs of wheel and brake group 1 and two EMAs of wheel and brake group 2, respectively. Smart EMAC 141 drives EMAs 151c, 151d of wheel and brake group 1 (161) and EMAs 152a, 152b of wheel and brake group 2 (162). Smart EMAC 142 drives EMAs 151a, 151b of wheel and brake group 1 (161) and EMAs 152c, 152d of wheel and brake group 2 (162). Similarly, on the right hand side of the aircraft the two smart EMACs 143, 144 drive two EMAs of wheel and brake group 3 and two EMAs of wheel and brake group 4, respectively. In an alternative configuration, one smart EMAC may drive all EMAs of a respective wheel and brake group.

The EMAs 151-154 convert the electrical power into mechanical power to provide clamping force to the brake associated with its respective wheel. The wheel and brake assembly converts the clamping force applied by the EMA into braking torque so as to decelerate or hold stationary the aircraft.

Each smart EMAC 141-144 includes a primary, or first, motor controller for driving the motor within each EMA 151-154 with which it is associated. To protect against the eventuality of a simultaneous failure of the motor controllers in the normal channel of each smart EMAC 141-144, due to a common mode failure at actuator control level, each smart EMAC further comprises a secondary, or second, motor controller. The primary motor controller forms part of a normal channel of the smart EMAC, and the secondary motor controller forms part of an emergency channel of the smart EMAC. The motor controller is the complex part of the smart EMAC, and so a dissimilar motor controller is incorporated within the smart EMAC to form part of the emergency channel.

The eBCU 123 within each smart EMAC 141-144 outputs brake control signals for the wheel and brake groups 161, 162, 163, 164. The eBCU 123 is operable to perform the same functions as the BCUs 121, 122 but is in use only when the system is in emergency mode. The eBCU 123 may comprise simpler technology, or may receive and output analogue signals only depending on the architecture. The eBCU 123 preferably performs fast loop anti-skid control for each of the braking wheels of the wheel and brake groups 161-164. The eBCU may be based upon dissimilar technology to the BCU for protection against common mode failures.

Figure 2:
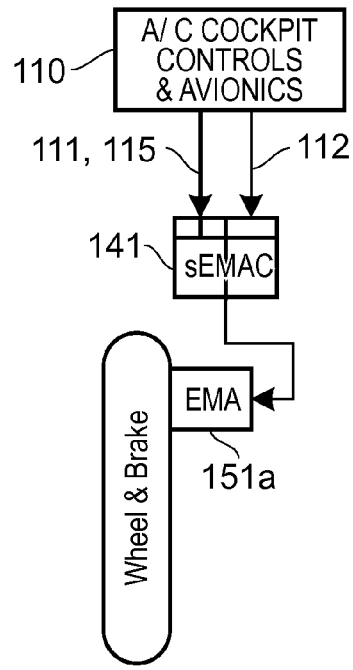
FIG. 2 illustrates a schematic of the control of a single EMA of the first embodiment.

FIG. 2 illustrates a schematic of the control of a single EMA 151a in the first embodiment in which the smart EMAC 141 is operable to compute brake force commands on a per wheel basis based on the databus 111, 115 and discrete 112 signals from the aircraft cockpit control and avionics 110. The smart EMAC 141 also receives electrical power to then provide power to drive the EMA 151a.

FIG. 3 illustrates schematically the normal and emergency channels within the smart EMAC 141. In the normal channel, the smart EMAC includes a side1 BCU function block 121, a side2 BCU function block 122, and a normal (primary) motor controller 145 which is a pulse-width modulation (PWM) signal generator for its four associated EMAs. In the emergency channel, the smart EMAC includes an eBCU function block 123 and an emergency (secondary) motor controller 146 which is a PWM signal generator for its four EMAs. The smart EMAC also includes a power inverter 147 for its four EMAs. The side1 and side 2 BCU function blocks 121, 122 include fast-loop anti skid control. The eBCU function block may or may not also include fast-loop anti skid control.

Figure 4:
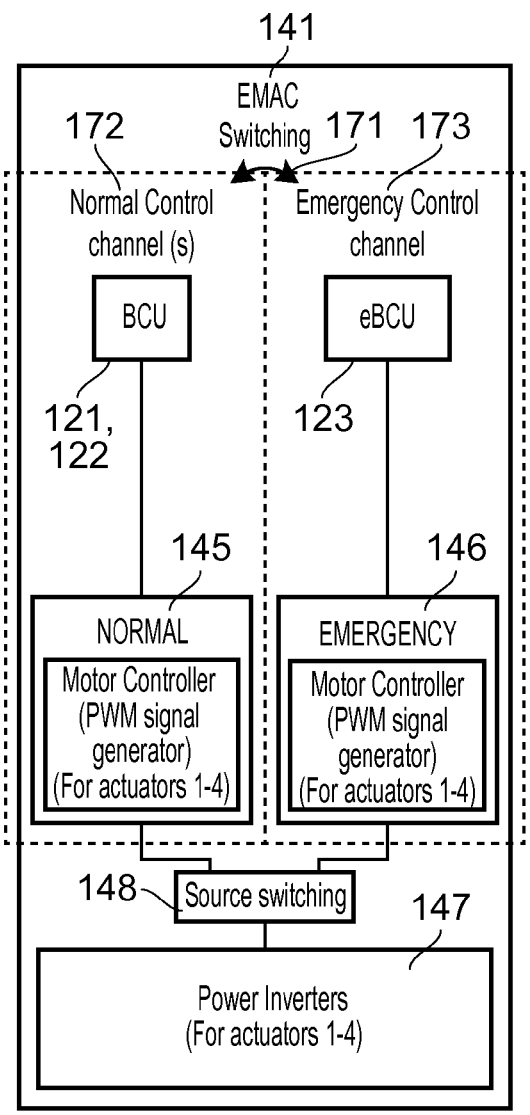
FIG. 4 illustrates a first example of a control scheme for the smart EMAC shown in FIG. 3.

FIG. 4 illustrates a first example of a control scheme for the smart EMAC 141 shown in FIG. 3. In this configuration the braking system control is switched 171 unitarily between normal 172 and emergency 173 channels such that the when the brake control channel is switched from the normal channel (though the BCU function block 121/122) to the emergency channel (through the eBCU function block 123) the motor control channel is also switched from the normal channel (through the smart EMAC primary motor controller 145) to the emergency channel (through the smart EMAC secondary motor controller 146). In this way the normal brake control channel always communicates with the normal motor control channel, and the emergency brake control channel always communicates with the emergency motor control channel.

As shown in FIG. 4 the smart EMAC further includes a source switch 148 for switching between the normal and emergency channels as both channels may be continuously transmitting. In a simplified arrangement an OR gate may be used in place of the source switch 148 if the control channels are not continuously transmitting.

Figure 5:
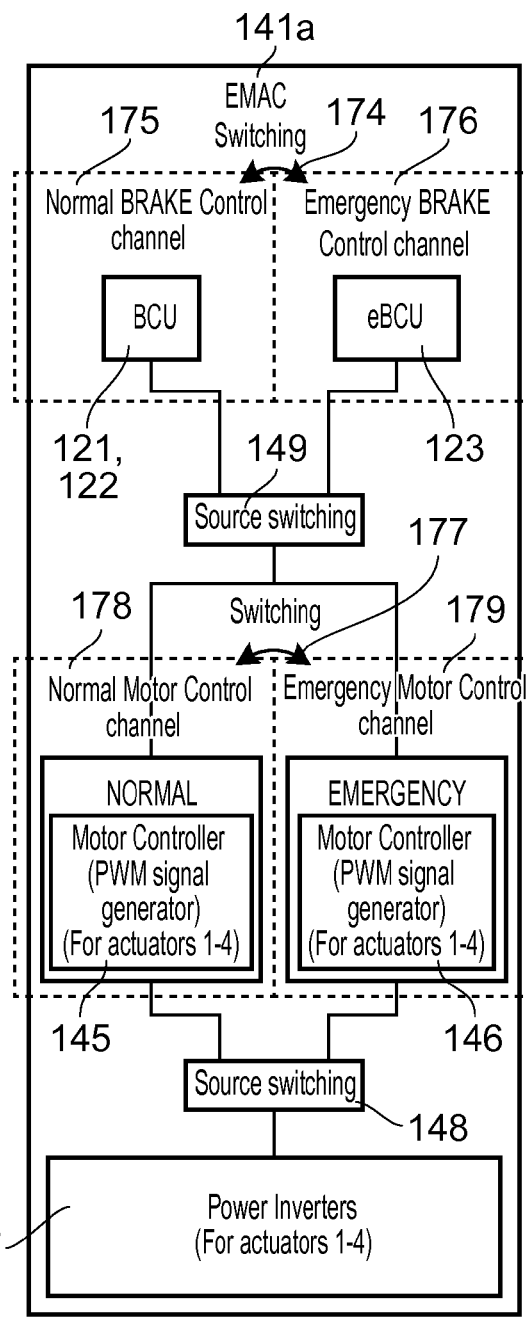
FIG. 5 illustrates a second example of a control scheme for the smart EMAC shown in FIG. 3.

FIG. 5 illustrates a second example of a control scheme for the smart EMAC shown in FIG. 3. In this configuration the active brake control channel of the BCU/eBCU function blocks and the active motor control channel of the smart EMAC 141a may be switched independently depending on failure conditions. Therefore the normal brake control channel (though the BCU 121/122 function blocks) may communicate with either the normal motor channel (through the smart EMAC primary motor controller 145) or the emergency motor channel (through the smart EMAC secondary motor controller 146). Similarly, the emergency brake control channel (though the eBCU function block 123) may communicate with either the normal motor channel (through the smart EMAC primary motor controller 145) or the emergency motor channel (through the smart EMAC secondary motor controller 146).

Unlike the FIG. 4 control scheme, in FIG. 5 the brake channel control is switched 174 between normal (BCU function block) 172 and emergency (eBCU function block) 173 channels, and the source switch 148 is arranged to switch between the outputs from the normal and emergency motor controllers 145, 146. The smart EMAC 141a further includes a source switch 149 for switching 177 the brake control received from either the BCU function blocks 121, 122 or the eBCU function block 123 to either the normal motor control channel 178 or the emergency motor control channel 179. In a simplified arrangement an OR gate may be used in place of the source switches 148, 149 if the control channels are not continuously transmitting.

Figure 6:
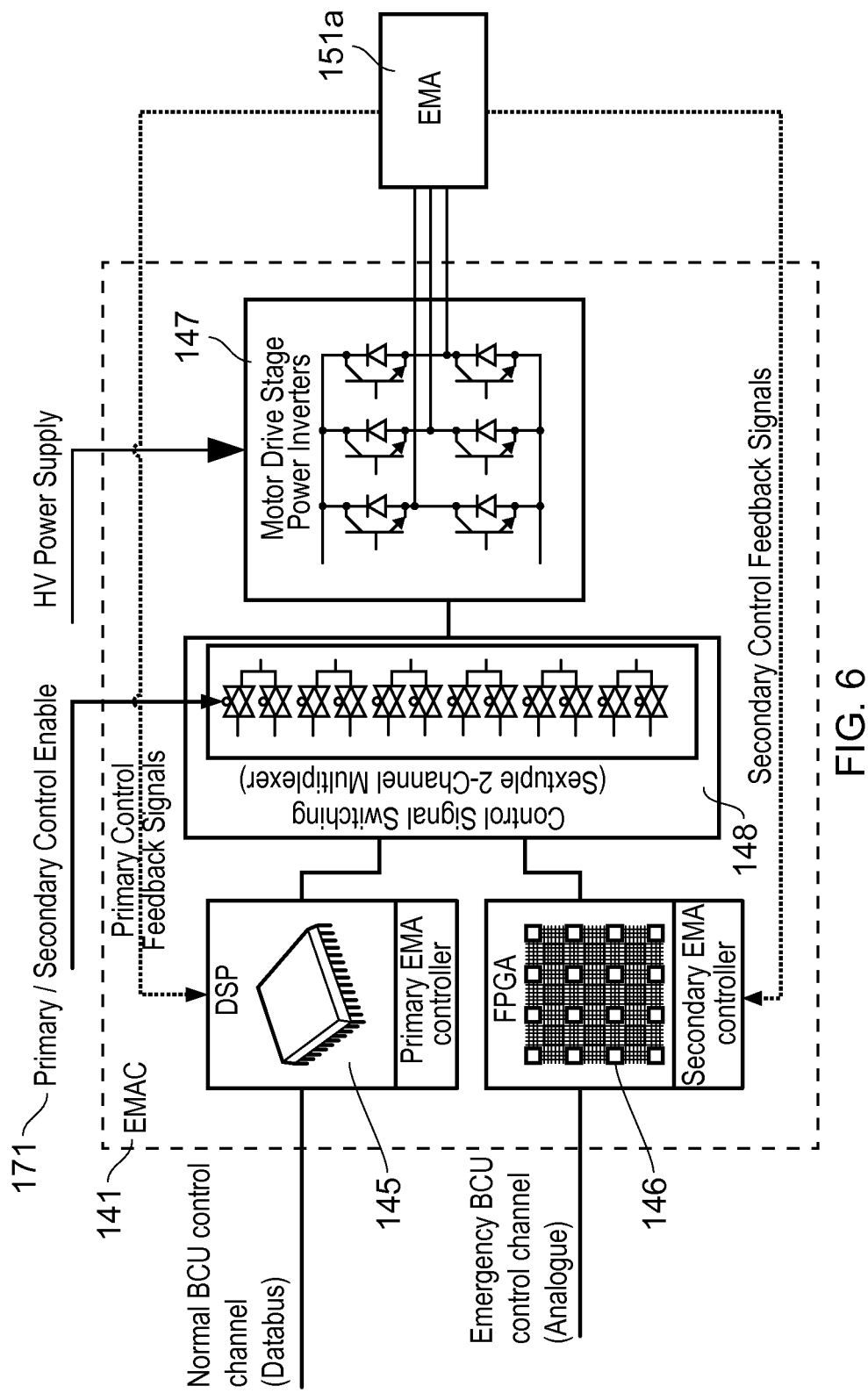
FIG. 6 illustrates in detail the dissimilar motor controllers used in the first example EMAC of FIG. 4.

FIG. 6 illustrates in detail one exemplary embodiment of the dissimilar motor controllers which may be used in the first example smart EMAC 141 of FIG. 4. The primary (normal) motor controller (PWM signal generator) 145 is a digital signal processor (DSP), and the secondary (emergency) motor controller (PWM signal generator) 146 is a field programmable gate array (FPGA). The source switch 148 is a sextuple 2-channel multiplexer. Feedback signals from the EMA 151a are directed to the primary and secondary controllers 145, 146.

Figure 6A:
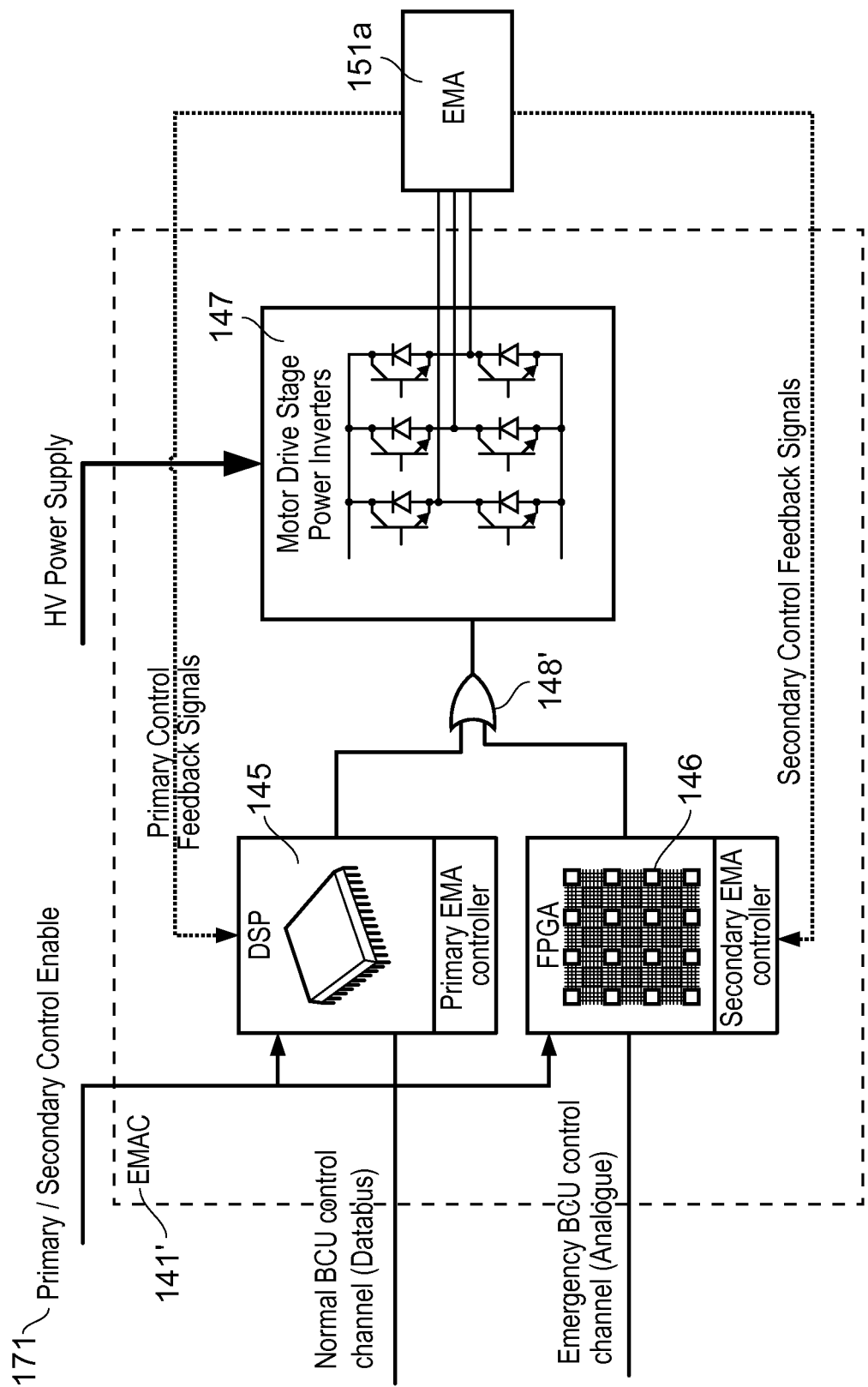
FIG. 6a illustrates in detail an alternative arrangement of the dissimilar motor controllers used in the first example smart EMAC of FIG. 4.

FIG. 6a illustrates an alternative smart EMAC 141' similar to FIG. 6 but in which the source switch 148 has been replaced by an OR gate 148'. In all other respects the EMAC 141' is identical to that shown in FIG. 6.

Figure 7:
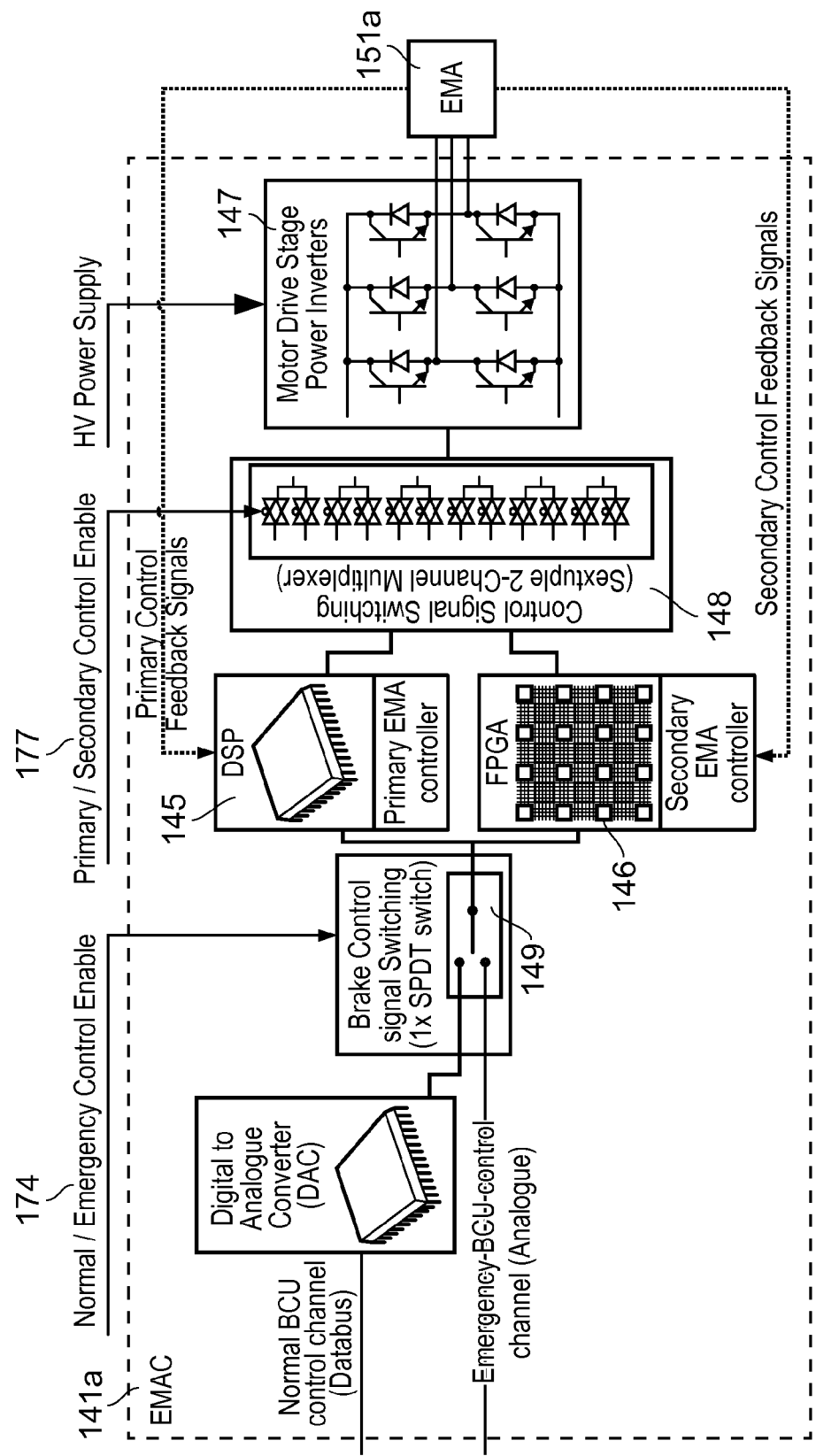
FIG. 7 illustrates in detail the dissimilar motor controllers used in the second example smart EMAC of FIG. 5.

FIG. 7 illustrates a smart EMAC 141a for use in the second example control scheme of FIG. 5. The normal/emergency brake channel switching 174 is effected by source switch 149, whilst the normal/emergency (primary/secondary) motor control channel switching 177 is effected by source switch 148.

Figure 7A:
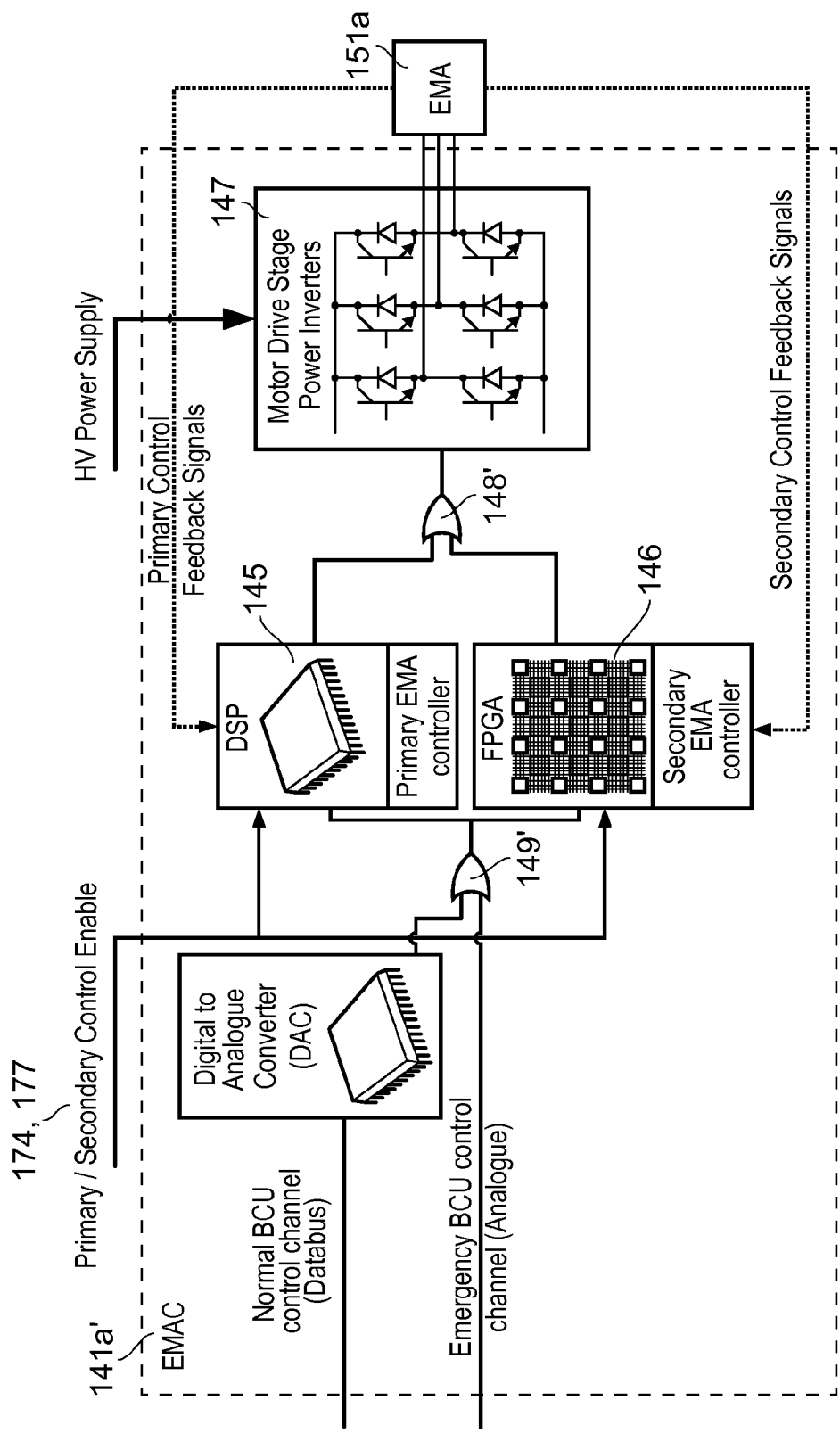
FIG. 7a illustrates in detail an alternative arrangement of the dissimilar motor controllers used in the second example smart EMAC of FIG. 5.

FIG. 7a illustrates an alternative smart EMAC 141a' similar to FIG. 7 but in which the source switches 148, 149 have been replaced by OR gates 148', 149', as described above, and the brake and motor control channel switching is provided by primary/secondary control enable 174, 177. In all other respects the smart EMAC 141' is identical to that shown in FIG. 7.

Whilst in FIG. 6-7a dissimilar technologies are used for the motor controllers 145, 146 the choice of DSP and FPGA should not be construed as limiting. A variety of hardware for PWM signal generating purposes are known including, but not limited to, processor based technologies such as microprocessors, microcontrollers and DSPs; logic based devices such as ASIC (application specified integrated circuits), PLD (programmable logic devices), CPLD (complex programmable logic devices) and FPGAs; and discrete electronics such as transistor based switching circuits for example. Any combination of two similar or dissimilar technologies may be selected for the two motor controllers of the smart EMAC.

Operation of the braking system 100 will now be described. During normal braking system operation when the pilot, co-pilot, autopilot, etc. operates the cockpit braking control cockpit signals, such as the brake pedal angle, are interpreted by the aircraft avionics at 110 and command and monitoring signals are sent to the side1 and side2 BCUs 121, 122. Discrete signals are also sent to the EBPSU hardware enable within the smart EMACs 141-144. The EBPSU hardware enable within the smart EMACs receives the braking enable signal from the aircraft cockpit controls 110 and allows high voltage power from the aircraft power network to be supplied to the power inverter stage 147 within the smart EMACs.

Either side1 or side2 BCUs 121, 122 compute the brake force required based upon the command signal received from the aircraft avionics and (if available) performs anti-skid computation based upon wheel speeds, before sending a modified braking force command to the normal motor control channel 145 within the smart EMACs. The normal motor control channel within the smart EMAC receives the brake force command from the BCUs and (based upon a determination of which BCU is currently active) computes a PWM signal which is sent to the power inverter stage 147 within the smart EMAC. The power inverter stage uses the PWM signal to modulate the power supply to the respective EMAs 151a-d, 152a-d, 153a-d, 154a-d. The EMAs receive the electrical power from the smart EMACs and produce a clamping force on the respective brakes in order to decelerate or hold stationary the aircraft.

In the case of a failure in one of the BCUs 121, 122 the system is operable to switch sides to the other active BCU 121, 122.

During emergency operation of the braking system two separate cockpit signals are sent via either analogue or digital means to the eBCU 123 and to the EBPSU hardware enable within the smart EMACs 141-144. The EBPSU hardware enable receives the braking enable signal and allows high voltage power to be supplied to the power inverter stage 147 within the smart EMACs. The eBCU 123 computes the braking force required based upon the command signal received from the aircraft avionics and (if available) performs anti-skid computation based upon wheel speeds, before sending a modified braking force command to the emergency motor control channel 146 within the smart EMACs. The emergency motor control channel within the smart EMAC receives the brake force command from the eBCU and computes a PWM signal which is sent to the power inverter stage 147 within the smart EMAC. The power inverter stage uses the PWM signal to modulate the power supply to the respective EMAs 151a-d, 152a-d, 153a-d, 154a-d. The EMAs receive the electrical power from the EMACs and produce a clamping force on the respective brakes in order to decelerate or hold stationary the aircraft.

FIG. 8 illustrates a second embodiment of an electrically actuated aircraft braking system featuring centralised avionics, and "smart" EMACs. The braking system shares many similarities with the system of FIGS. 1-7 and includes the following key difference. In place of the "smart" EMACs 141-144 in which the normal and emergency BCU functionality is packaged within the EMAC in a single line replaceable unit (LRU), the smart EMAC 241 has only the emergency BCU (eBCU) functionality incorporated in the LRU whilst the (normal) side 1 and side 2 BCU 121, 122 function blocks remain separate and remote from the smart EMAC 241. The smart EMAC shown in FIG. 8 would replace each of the four smart EMACs 141-144 of the first embodiment described above. The BCUs 121, 122 would typically be located between the aircraft cockpit controls and avionics 110 and the routers 131, 132 shown in FIG. 1. As in the first embodiment, the eBCU function block of the smart EMAC 241 receives input from aircraft cockpit controls and avionics 110 via one or more databuses 112 or analogue and/or discrete signals. FIG. 9 shows the function blocks of the smart EMAC 241 in detail, and like reference numerals have been used to denote like parts with FIGS. 1-7.

Although the invention has been described above with reference to one or more preferred embodiments, it will be appreciated that various changes or modifications may be made without departing from the scope of the invention as defined in the appended claims.

The invention claimed is:

1. An electrically actuated braking system for an aircraft, comprising:
   an electro-mechanical brake actuator (EMAbrake) proximate a wheel of the aircraft, the EMAbrake including a motor;
   an electro-mechanical actuator controller (EMAC) including a motor controller for generating a drive signal for the EMAbrake;
   a braking control unit (BCU) configured to generate a braking force command signal for the EMAC during a normal mode of operation; and
   an emergency braking control unit (eBCU) for generating a braking force command signal for the EMAC during an emergency operating mode,
   wherein the eBCU is disposed together with the EMAC in a common line replaceable unit (LRU).

2. The electrically actuated braking system according to claim 1, wherein the BCU is disposed together with the EMAC in a common line replaceable unit (LRU).

3. The electrically actuated braking system according to claim 1, wherein the BCU is disposed remote from the EMAC.

4. The electrically actuated braking system according to claim 1, wherein the EMAC is disposed remote from the EMAbrake.

5. The electrically actuated braking system according to claim 1, wherein the BCU is operable to perform anti-skid brake control.

6. The electrically actuated braking system according to claim 1, wherein the eBCU is operable to perform anti-skid brake control.

7. The electrically actuated braking system according to claim 1, wherein the EMAC includes a first motor controller configured to generate a first drive signal for the EMAbrake, and a second motor controller configured to generate a second drive signal for the EMAbrake, and wherein the first motor controller and the second motor controller are dissimilar so as to provide protection against common mode failure of the first and second motor controllers.

8. The electrically actuated braking system according to claim 7, wherein the BCU is operable on a normal brake channel, the eBCU is operable on an emergency brake channel, the first motor controller is operable on a normal motor control channel, and the second motor controller is operable on an emergency motor control channel.

9. The electrically actuated braking system according to claim 8, wherein the BCU is configured to communicate with the first motor controller and not the second motor controller, and the eBCU is configured to communicate with the second motor controller and not the first motor controller.

10. The electrically actuated braking system according to claim 9, wherein the normal brake channel and the normal motor control channel are coupled so as to form a normal channel, and the emergency brake channel and the emergency motor control channel are coupled so as to form an emergency channel, and the system further comprises a switch for switching between the normal channel and the and emergency channel.

11. The electrically actuated braking system according to claim 8, wherein the BCU is configured to communicate with either the first motor controller or the second motor controller, and the eBCU is configured to communicate with either the first motor controller or the second motor controller.

12. The electrically actuated braking system according to claim 11, further comprising a first switch configured to switch between the normal and emergency brake channels, and a second switch configured to switch between the normal and emergency motor control channels.

13. The electrically actuated braking system according to claim 12, wherein the first switch and the second switch are independently switchable.

14. The electrically actuated braking system according to claim 8, further comprising a source switch operatively coupled between the normal and emergency motor control channels and the EMAbrake configured to switch the EMAbrake control depending on the selected motor control channel.

15. The electrically actuated braking system according to claim 8, further comprising an OR gate operatively coupled between the normal and emergency motor control channels and the EMAbrake configured to control the EMAbrake depending on the operative motor control channel.

16. The electrically actuated braking system according to claim 8, wherein the BCU includes redundant brake control channels each designated to communicate with aircraft cockpit controls and avionics via a respective databus.

17. The electrically actuated braking system according to claim 7, wherein the first motor controller and the second motor controller each comprise hardware for generating a pulse-width modulation signal.

18. The electrically actuated braking system according to claim 7, wherein the first motor controller and the second motor controller each comprise a different hardware selected from the group comprising: a microprocessor, a microcontroller, a digital signal processor, an application specific integrated circuit, a programmable logic device, a complex programmable logic device, a field programmable gate array, and a transistor based discrete electronics switching circuit.

19. The aircraft including an electrically actuated braking system according to claim 1.

20. An electrically actuated braking system configured for an aircraft comprising:
  an electro-mechanical brake actuator (EMAbrake) proximate a wheel of the aircraft, the EMAbrake including a motor;
  an electro-mechanical actuator controller (EMAC) including a motor controller configured to generate a drive signal to actuate the EMAbrake;
  a braking control unit (BCU) configured to generate a braking force command signal to control the EMAC during a normal mode of operation; and
  an emergency braking control unit (eBCU), separate of the BCU, configured to generate a braking force command signal to control the EMAC during an emergency operating mode,
  wherein the eBCU and the EMAC are disposed together in a common line replaceable unit (LRU).

* * * * *